Figure 1:
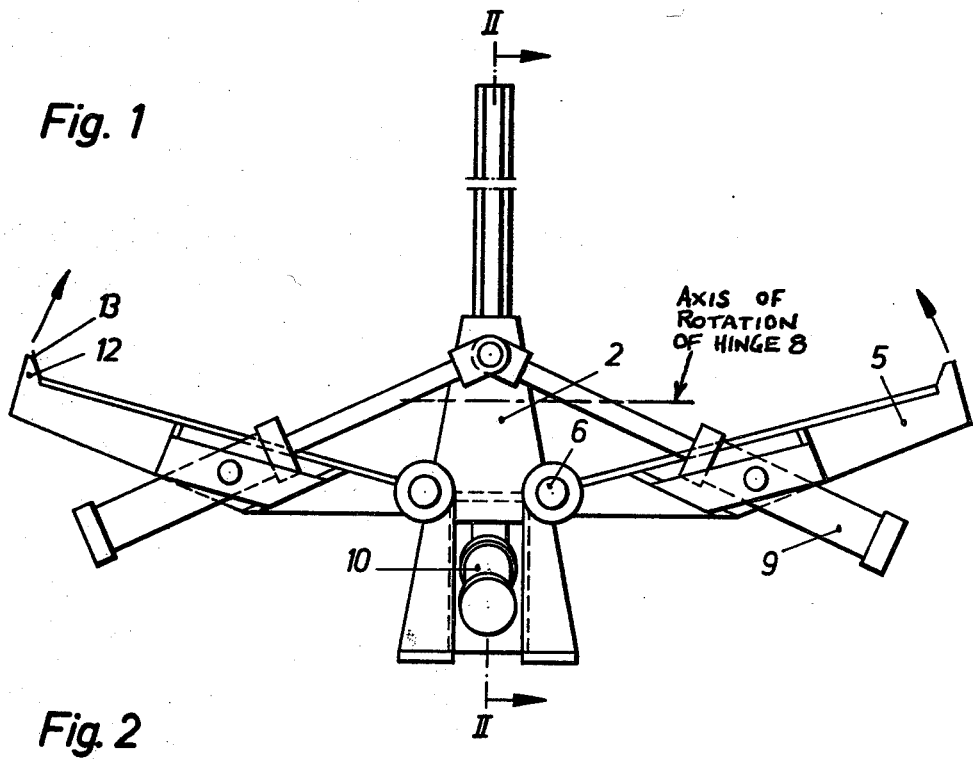

United States Patent

[11] 3,554,121

[72] Inventors Hellmut Galter;
 Volker Stille, Kassel, Germany
[21] Appl. No. 794,278
[22] Filed Jan. 27, 1969
[45] Patented Jan. 12, 1971
[73] Assignee Rheinstahl Henschel Aktiengesellschaft
 Kassel, Germany
[32] Priority Jan. 27, 1968
[33] Germany
[31] No. 1,627,960

[54] APPARATUS FOR COMPRESSING AUTOMOBILE BODIES
 3 Claims, 2 Drawing Figs.
[52] U.S. Cl. .................................................. 100/232,
 100/233, 100/264, 100/269, 100/29S
[51] Int. Cl. ...................................................... B30b 7/04
[50] Field of Search............................................ 100/42,
 232, 233, 264, 269, 295, auto body curless, can curless

[56] References Cited
UNITED STATES PATENTS
2,958,273 11/1960 Morrow........................ 100/264UX
3,101,044 8/1963 Schlidt et al................. 100/42

*Primary Examiner*—Billy J. Wilhite
*Attorney*—Walter Becker

ABSTRACT: Apparatus for compressing automobile bodies comprising a preferably U-shaped support and sheet metal plates welded to the end faces of the machine frame while being provided with lateral flaps hinged to opposite sides of said machine frame, a wedge member being pivotally connected to one end face of the machine frame, and said lateral flaps and wedge member being adapted to be tilted toward the automobile body inserted perpendicularly with regard to the longitudinal axis of the machine frame.

PATENTED JAN 12 1971  3,554,121

INVENTORS:
HELLMUT GALTER
VOLKER STILLE
BY

APPARATUS FOR COMPRESSING AUTOMOBILE BODIES

The present invention relates to an apparatus for compressing automobile bodies of junked automobiles.

The heretofore known customary methods for cutting up automobile bodies by means of shears or baling presses do not meet one important requirement.

The steel scrap is not free from foreign bodies, as for instance copper, aluminum, brass, zinc, and possibly also paint. With the heretofore developed shredders, the automobile bodies are beaten up to small sheet metal pieces which are then magnetically sorted and posttreated in furnaces so as to yield the desired high value scrap. Such structures, however, are rather large and become economical only if they are continuously supplied with automobile bodies to be cut up. Therefore, it is necessary to transport old automobile bodies from a fairly wide surrounding to a shredder installation which involves considerable cost.

It is, therefore, an object of the present invention to provide an apparatus for compressing automobile bodies which will make it possible with a minimum of power and a minimum of machinery to compress automobile bodies to a packet which can easily be handled.

It is a further object of this invention to provide an apparatus, as set forth in the preceding paragraph, which will compress the respective automobile body to a compact packet without the thickness of the formed packet interfering with the cutting up of the packet later in shredder installations.

These and other objects and advantages of the invention will appear more clearly from the following specification, in connection with the accompanying drawing, in which:

FIG. 1 diagrammatically illustrates a front view of an apparatus according to the invention.

Figure 2:
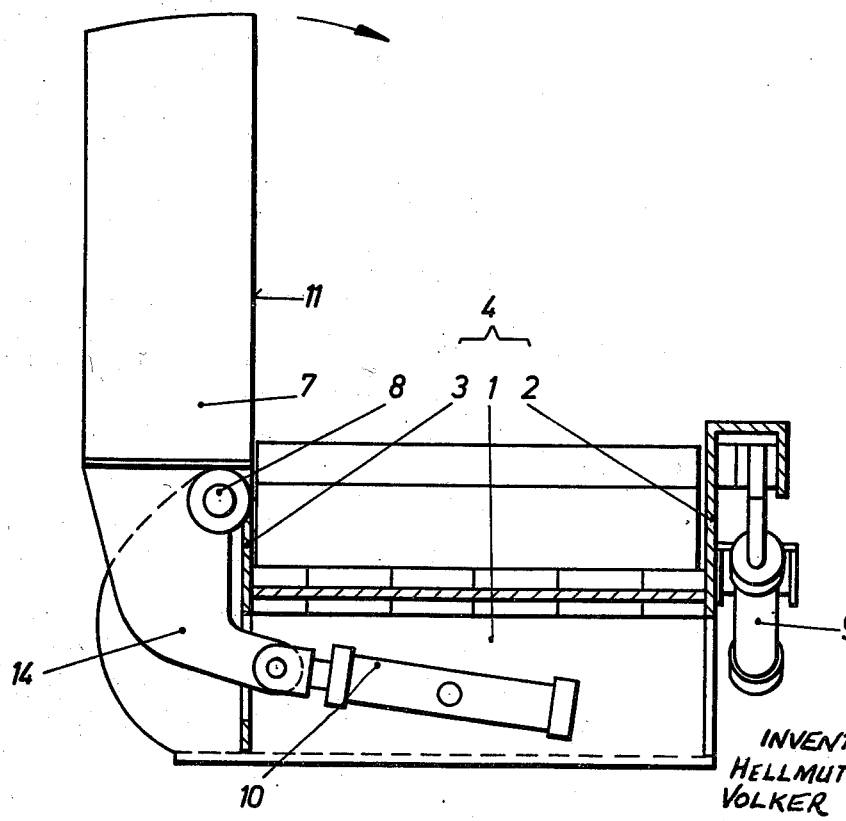

FIG. 2 diagrammatically illustrates a section taken along the line II-II of FIG. 1.

The apparatus according to the present invention is characterized primarily, in that a machine frame comprising a U-shaped support and sheet metal plates welded to the end faces of the machine frame is provided with lateral flaps or gates hinged thereto and has a wedge member connected to one end face of the machine frame by means of a hinge, said lateral flaps and wedge member being adapted to be tilted by hydraulic cylinder piston means toward the automobile body inserted perpendicularly with regard to the longitudinal axis of the machine frame.

In this way that portion of the automobile body which is most difficult to deform, namely, the bottom of the automobile body will be deformed the least whereas the roof of the automobile body will be pressed in by the wedge member in a direction transverse to the longitudinal axis of the automobile body. In view of the thus obtained bend, the automobile body loses a portion of its rigidity.

Referring now to the drawing in detail, the apparatus according to the present invention comprises a U-shaped support 1 which is preferably composed of metal sheets welded together. To the end faces of said support 1 there are welded two metal plates 2 and 3. These two plates together with the support 1 form the machine frame. The lateral flaps or gates 5 are by means of hinges 6 connected to the two sides of the frame 4. Furthermore, a wedge member 7 is by means of a hinge 8 connected to one end face of the support. Each of the two lateral flaps 5 and the wedge member 7 are adapted at their hinges to be tilted by hydraulic cylinder piston systems 9 and 10 respectively. An automobile body (not shown in the drawing), is so inserted into the apparatus that its longitudinal axis will be substantially perpendicular to the longitudinal axis of the machine frame 4. The wedge member 7 is lowered until the front edge 11 of the wedge member 7 is horizontal. In this way the roof of the automobile body is pressed in and the bottom plate is bent or folded. The wedge member 7 is hydraulically locked by closing the oil supply and oil discharge from the cylinder piston system 10, when the wedge member is in its moved-down position.

The cylinder piston systems 9 now begin to lift the lateral flaps 5. In this way the automobile body is further pressed together about the bend previously formed. The lifting of the lateral flaps is not carried out in a continuous movement, but the operation is interrupted after approximately three quarters of the stroke so that the wedge member 7 can be tilted out of the not yet completely compressed automobile body. In this way the noses 12 provided on the lateral flaps 5 prevent the automobile body from sticking to the wedge member. After the wedge member 7 has returned to its starting position, which means again stands vertically, the two lateral flaps 5 are closed further until the noses 12 have their end faces 13 hit each other. A bell crank lever 14 is connected to cylinder 10 and hinge 8. The lateral flaps 15 are then again opened, the compressed packet is removed, and the apparatus is ready for further action.

With the packet produced by the apparatus according to the invention, the relatively smooth bottom side of the compressed automobile body forms the outside. The requirement of work for producing such a packet is rather low in comparison to the heretofore customary scrap presses with box-shaped deforming chambers.

It is, of course, to be understood that the present invention is, by no means, limited to the particular showing in the drawing, but also comprises modifications within the scope of the appended claims.

We claim:

1. An apparatus for compressing an automobile body, which includes: a frame structure comprising a support with oppositely located end faces, said frame structure also comprising end plate means connected to said end faces of said support, lateral flaps respectively pivotally connected to oppositely located sides of said frame structure for pivoting toward and away from each other, compressing means pivotally connected to said frame structure at one of said end plate means for pivoting in a substantially vertical plane passing through both of said end plate means, and power operable means respectively operatively connected to said lateral flaps and said compressing means for respectively pivoting said compressing means in said substantially vertical plane through both of said end plate means and for pivoting said lateral flaps in a substantially vertical plane perpendicular to said first mentioned plane.

2. An apparatus according to claim 1, in which said compressing means has a wedge-shaped cross section with the wider side thereof facing outwardly.

3. An apparatus according to claim 2, in which said lateral flaps are provided with noses pointing toward each other when said flaps are pivoted toward each other, said noses respectively being provided with edges for abutment with each other when said lateral flaps are pivoted toward each other.